(12) United States Patent
Christopherson

(10) Patent No.: US 6,601,917 B1
(45) Date of Patent: Aug. 5, 2003

(54) COVER FOR CHILD SEAT ANCHOR

(75) Inventor: Sven Christopherson, Durand, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 09/914,709
(22) PCT Filed: Mar. 2, 2000
(86) PCT No.: PCT/CA00/00233
§ 371 (c)(1), (2), (4) Date: Aug. 31, 2001
(87) PCT Pub. No.: WO00/51471
PCT Pub. Date: Sep. 8, 2000

Related U.S. Application Data
(60) Provisional application No. 60/122,666, filed on Mar. 3, 1999.

(51) Int. Cl.[7] .............................................. B60R 22/10
(52) U.S. Cl. ..................... 297/253; 297/250.1; 297/254; 403/315; 24/633; 24/637
(58) Field of Search .............................. 297/250.1, 253, 297/254; 403/365, 367, 373, 315, 317; 24/3.12, 633, 635, 637; 280/801.2

(56) References Cited

U.S. PATENT DOCUMENTS

| | | | |
|---|---|---|---|
| 4,183,580 A | * | 1/1980 | Johansson ............... 297/256.11 |
| 4,527,835 A | | 7/1985 | Barnett |
| 4,675,954 A | | 6/1987 | Gullickson |
| 4,726,625 A | | 2/1988 | Bougher |
| 4,731,912 A | | 3/1988 | Boriskie et al. |
| 4,822,104 A | | 4/1989 | Plesniarski |
| 4,848,794 A | | 7/1989 | Mader et al. |
| 4,878,277 A | | 11/1989 | Portuese |
| 4,939,824 A | | 7/1990 | Reed |
| 4,987,662 A | | 1/1991 | Haffey et al. |
| 5,098,162 A | | 3/1992 | Forget et al. |
| 5,466,044 A | * | 11/1995 | Barley et al. ................ 297/252 |
| 5,617,617 A | | 4/1997 | Gustin |
| 5,746,449 A | | 5/1998 | Hiroshige |
| 5,791,688 A | | 8/1998 | Koledin |
| 5,820,164 A | | 10/1998 | Patel et al. |
| 5,918,934 A | * | 7/1999 | Siegrist .................... 297/250.1 |
| 6,267,442 B1 | * | 7/2001 | Shiino et al. ................ 297/254 |
| 6,397,440 B1 | * | 6/2002 | Sack et al. ..................... 24/647 |

FOREIGN PATENT DOCUMENTS

| | | |
|---|---|---|
| EP | 0 552 570 A3 | 12/1992 |
| EP | 0 552 570 A2 | 12/1992 |
| EP | 0 619 202 B1 | 3/1994 |
| EP | 0 901 935 A3 | 7/1998 |
| EP | 0 901 935 A2 | 7/1998 |
| JP | 911847 A * | 1/1997 |
| JP | 2002104037 A * | 4/2002 |

* cited by examiner

*Primary Examiner*—Peter M. Cuomo
*Assistant Examiner*—Joseph Edell
(74) *Attorney, Agent, or Firm*—Clark Hill PLC

(57) ABSTRACT

A seat assembly (10) for a vehicle having an anchor (16) for a child seat (15) disposed between a seat cushion (12) and a seat back (14). The invention is characterized by a cover (17) movable into a retracted and closed position between the seat cushions (12) and the seat back (14) covering the anchor (16) and out of the retracted position to an extended and fully open position out from between the seat cushions (12) and seat back (14) exposing the anchor (16) for attachment to the child seat (15). The cover (17) includes guide slots (34, 36) for slidably receiving side portions (50) of the anchor (16) and a ramped surface (60) automatically moves the lid (20) from the closed position to the fully open position in response to the housing (18) moving relative to the anchor (16).

34 Claims, 4 Drawing Sheets

COVER FOR CHILD SEAT ANCHOR

RELATED APPLICATION

This application claims priority to and all the benefits of U.S. Provisional Patent Application Ser. No. 60/122,666, which was filed on Mar. 3, 1999 entitled "COVER FOR CHILD SEAT ANCHOR".

FIELD OF THE INVENTION

The subject invention relates to a seat assembly for a vehicle which includes an anchor between the seat cushion and seat back for anchoring a child seat. In particular, the subject invention relates to a cover for selectively concealing the anchor.

BACKGROUND OF THE INVENTION

Portable child seats which can be removably installed within a vehicle are becoming increasing popular. Anchors are typically provided in a seat assembly of the vehicle wherein the child seat may be secured to the anchors. A number latches, hooks or other like devices, are provided on the child seat to lock to the anchors thereby securing the child seat to the seat assembly. In order to provide a secure attachment for the child seat to the seat assembly, the anchors are typically fixed to.a frame of the seat assembly or directly to the vehicle.

The anchors are usually accessible between the seat cushion and the seat back. When the anchors are not in use, the anchors can be an obstruction and an annoyance.

It has been known to employ covers for seat belt anchors, and the like. Examples of such covers are shown in U.S. Pat. No. 4,527,835 Barnett; U.S. Pat. No. 5,098,162 Forget et al.; U.S. Pat. No. 5,746,449 Hiroshige and U.S. Pat. No. 5,820,164 Patel et al. These covers, however, are not configured to cover a child seat anchor. In addition, these designs merely cover a portion of the seat belt. Due to the entire exposure of the cover itself, these prior art covers can be equally annoying.

SUMMARY OF THE INVENTION AND ADVANTAGES

A seat assembly comprising a seat cushion and an anchor presented by the seat cushion for anchoring a child seat. The assembly is characterized by a cover disposed about the anchor and movable between a retracted and closed position and an extended and fully open position. When moving from the fully open position to the closed position the cover slides along the anchor in a first direction and conceals the anchor. When moving from the closed position to the fully open position the cover slides along the anchor in a second direction opposite the first direction and exposes the anchor for attachment to the child seat.

Accordingly, the subject invention provides a seat assembly having a cover for an anchor that is movable to a retracted and less viewable closed position.when the anchor is not in use. Additionally, the cover may be pulled along the anchor to a filly open position from the closed position when the anchor is to be used. Furthermore, the cover aids in locating the anchor on the seat assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
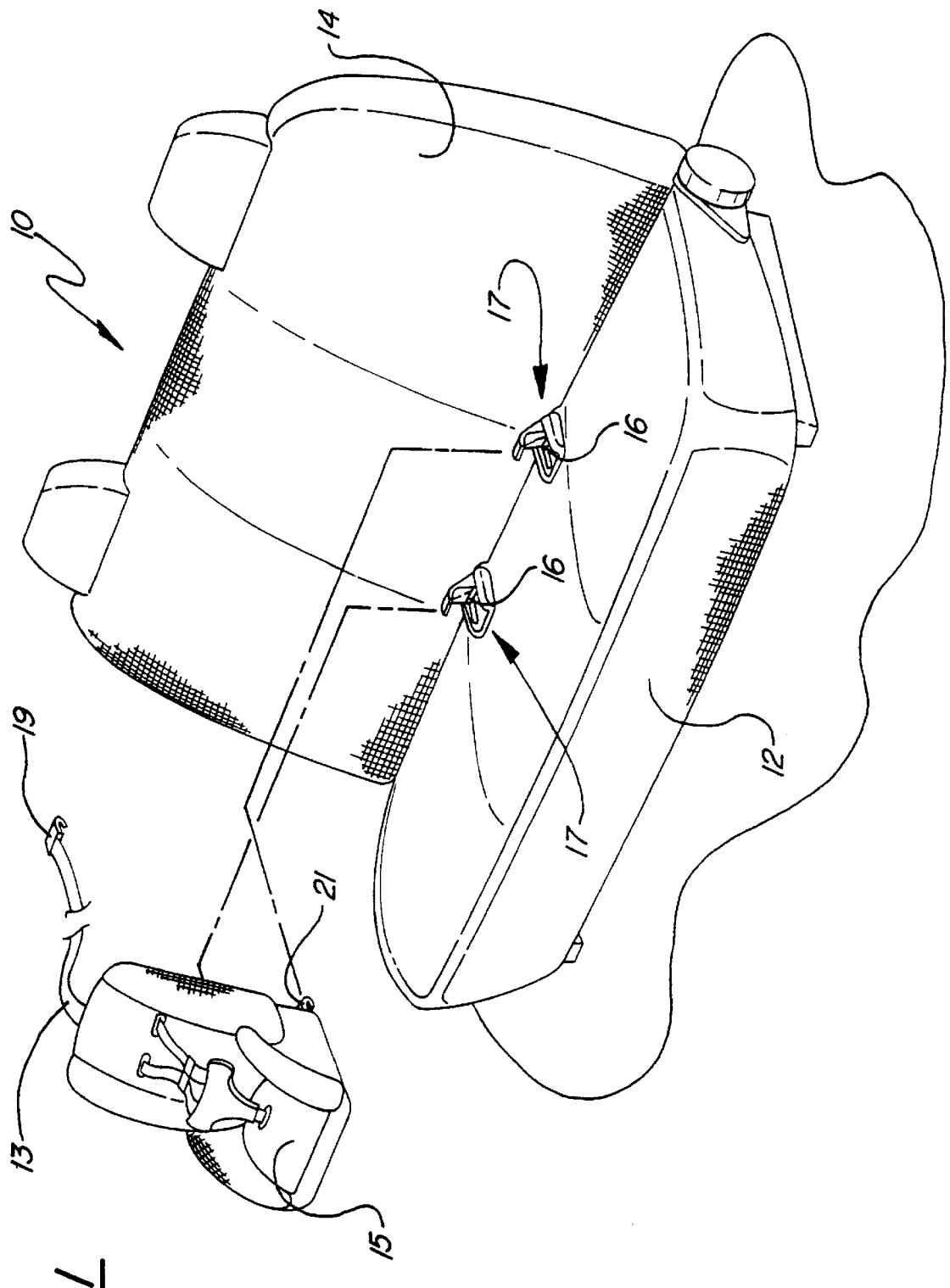
FIG. 1 is a perspective view of a seat assembly according to this invention and a child seat in spaced relationship thereto.

Referring to the Figures, wherein like numerals indicate like or corresponding parts throughout the several views, a seat assembly is generally shown at 10 in FIG. 1. The seat assembly 10 includes a seat cushion 12 and a seat back 14. Both the seat cushion 12 and seat back 14 are of a conventional design and each include a corresponding frame, foam pad and trim cover.

A child seat 15, shown in spaced relationship to the seat assembly 10, may be secured to the seat 10. The child seat 15 includes an upper tether 13 having an upper latch 19 and a pair of lower latches 21 which secure the child seat 15 to the seat assembly 10. The particular embodiment of the child seat 15 and associated latches 19, 21 may be of any suitable design. In fact, there may be any number of latches extending from any suitable section of the child seat 15 which can secure the child seat 15 to the seat assembly 10.

A plurality of anchors 16 extend outward from a juncture of the seat cushion 12 and seat back 14 to provide mounting points for the child seat latches 19, 21. The anchors 16 are preferably secured to the seat frame for transferring loads from the child seat 15 to the vehicle. As illustrated, there are two spaced-apart anchors 16 extending from a front of the seat assembly 10. The seat assembly 10 may also include a rear anchor (not shown) extending from the rear of the seat assembly 10. The two front anchors 16 are presented for the lower latches 21 and the rear anchor is presented for the upper latch 19.

To secure the child seat 15 to the seat assembly 10, a user engages the two lower latches 21 to corresponding front anchors 16 and secures the upper latch 19 to the rear anchor. The tether 13 extends from the top of the child seat 15 and over the seat back 14.

In accordance with the subject invention, a cover assembly, generally shown at 17, is disposed about each of the front anchors 16 for selectively covering and concealing the anchors 16. Preferably, the cover 17 is injection molded using a durable plastic material, such as polypropylene or polyethylene. Optionally, the cover 17 can be textured, such as a textile surface, to provide a cushion feel.

Figure 2:
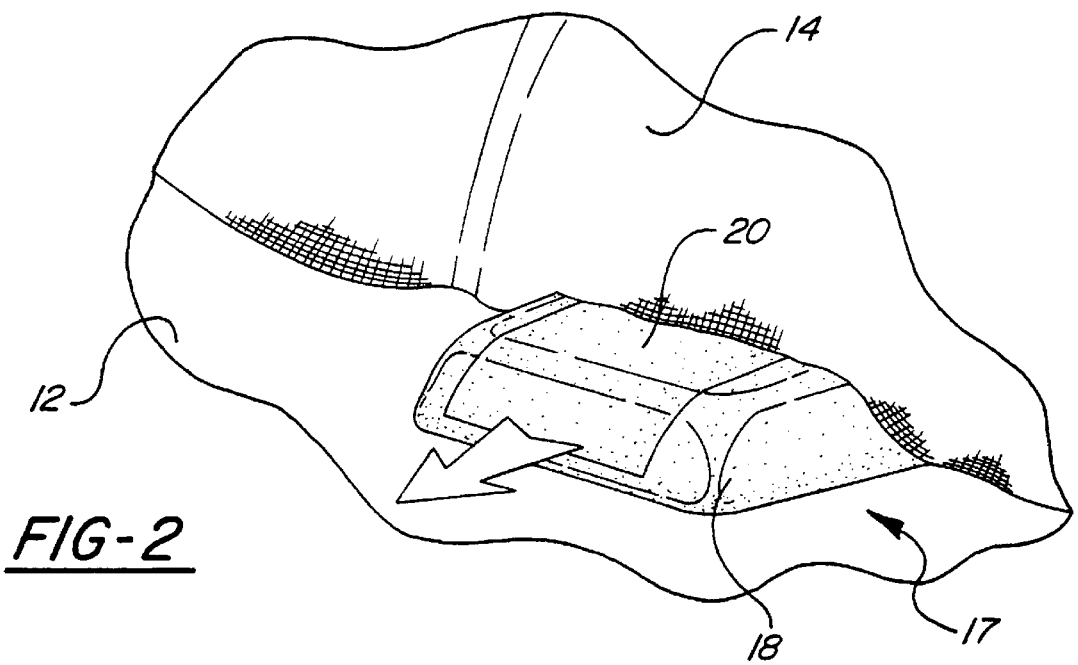
FIG. 2 is an enlarged view of a portion of the seat assembly as shown in FIG. 1 illustrating a cover for a child seat anchor in a retracted and closed position such that the child seat anchor is concealed by the cover.
Figure 3:
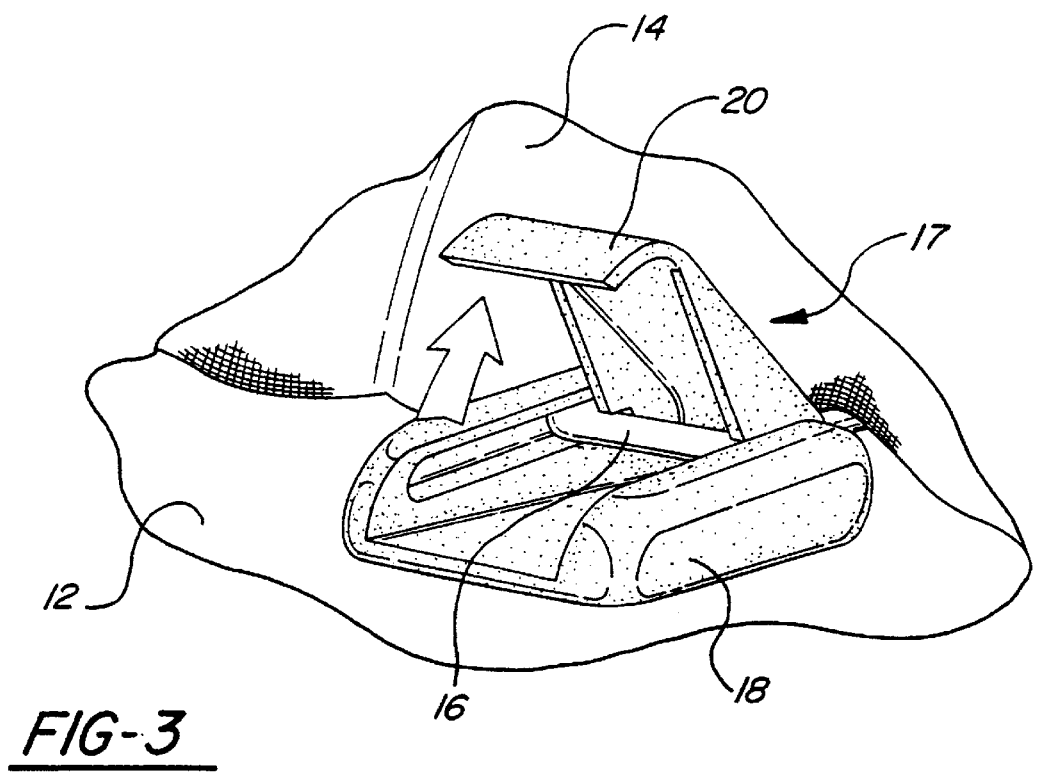
FIG. 3 is a view similar to FIG. 2, except that the cover is illustrated in an extended and open position such that the anchor is exposed.

Each of the covers 17 and associated anchors 16 are substantially identical. Hence, for illustrative purposes, only one cover 17 and corresponding anchor 16 will be subsequently discussed. Referring also to FIGS. 2 and 3, the cover assembly 17 is shown in greater detail. The cover 17 is movable between a retracted and closed position as shown in FIG. 2, and an extended and fully open position, as shown in FIG. 3. In the closed position, the cover 17 is at least partially tucked between the seat cushion 12 and the seat back 14 and conceals the anchor 16. In addition, the cover 17 is designed to mark the location of the child seat anchor 16 between the seat cushion 12 and the seat back 14.

The cover 17 is pulled in the direction of the arrow in FIG. 2 in order to move the cover 17 from the closed position to the fully open position. When moving from the closed position to the fully open position, the cover 17 extends out from between the seat cushion 12 and seat back 14 and opens to expose the child seat anchor 16 such that the child seat 15 may attach thereto. The arrow in FIG. 3 identifies the direction in which the cover 17 opens. Preferably, the cover 17 moves linearly relative to the anchor 16 and seat cushion 12 between the open and closed positions. As appreciated, the cover 17 may move arcuately or a combination of arcuate and linear movement without deviating from the scope of the subject invention.

Figure 4:
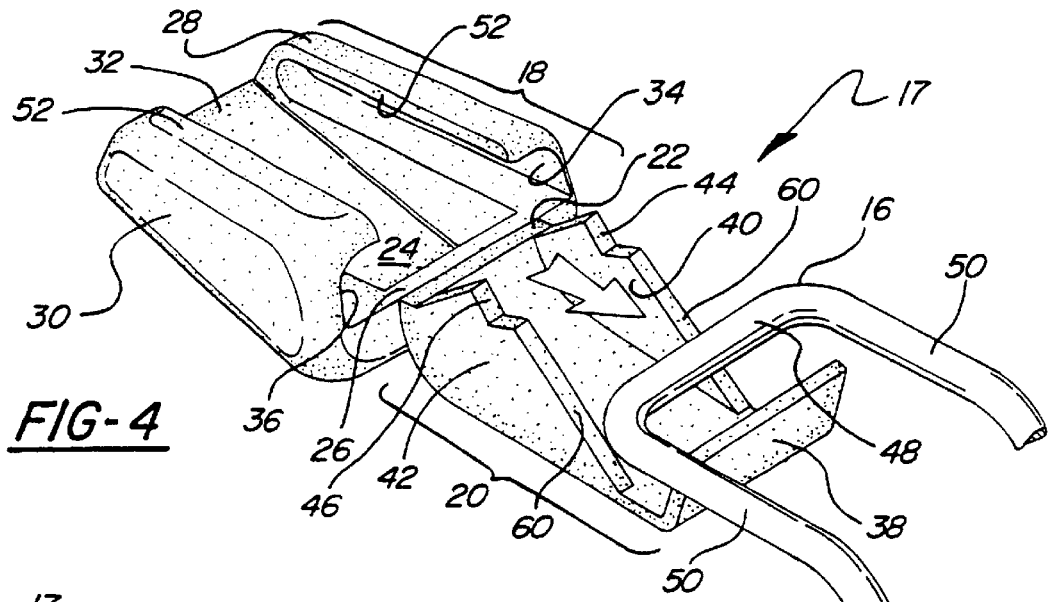
FIG. 4 is a perspective top view of the cover and the anchor illustrating a first assembly step.
Figure 5:
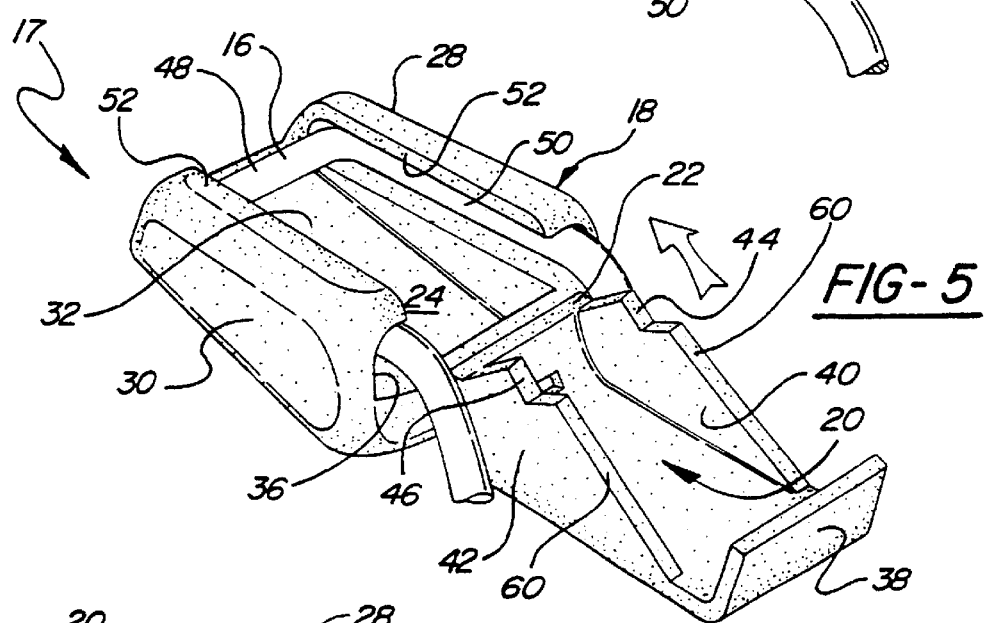
FIG. 5 is a perspective top view of the cover and the anchor illustrating a second assembly step.
Figure 6:
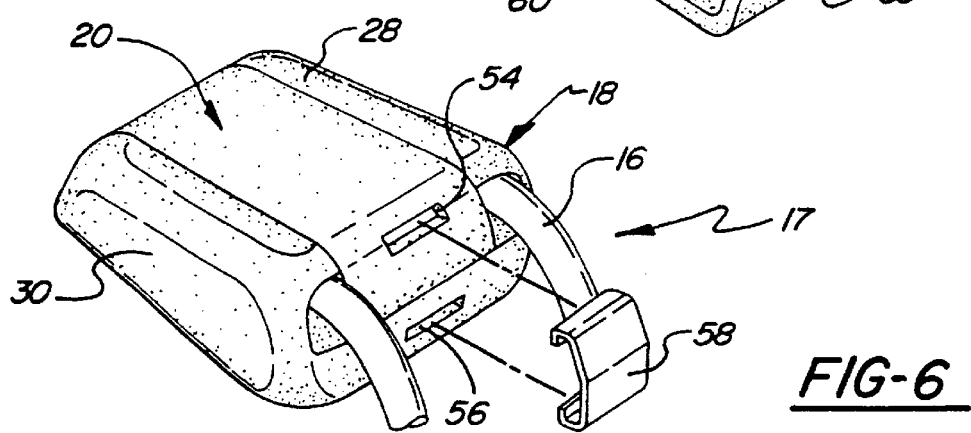
FIG. 6 is a perspective top view of the cover and the anchor illustrating a third assembly step.

FIGS. 4, 5, and 6 illustrate the cover 17 and anchor 16 in greater detail. In particular, FIGS. 4–6 illustrate a sequence of steps to assemble the cover 17 to the anchor 16.

FIG. 4 is a perspective top view of the cover 17 and the anchor 16 illustrating a first assembly step. The arrow in FIG. 4 identifies the direction in which the cover 17 is assembled to the anchor 16. FIG. 5 is a perspective top view of the cover 17 and the anchor 16 illustrating a second assembly step. The arrow in FIG. 5 identifies the direction in which a lid 20 of the cover 17 is rotated during assembly of the cover 17 to the anchor 16. FIG. 6 is a perspective top view of the cover 17 and the anchor 16 illustrating a third and final assembly step.

The lid 20 is interconnected by a living hinge 22 to a housing 18. The housing 18 has a bottom surface 24, a rear wall 26, and a pair of opposing side walls 28 and 30 which form an internal cavity 32. As best shown in FIG. 4, the side wall 28 includes a first guide 34 and the side wall 30 includes a second guide 36. The guides 34, 36 slidably support the housing 18 on the anchor 16 for defining the movement of the cover 17 between the closed and fully open positions. Preferably, the first guide 34 is a first slot 34 formed in the side wall 28 and the second guide 36 is a second opposing slot 36 formed in the side wall 30. Even more preferably, the slots 34, 36 slant upwardly and rearwardly relative to the bottom 24.

As best shown in FIGS. 4 and 5, the housing 18 also includes flanges 52 overlying the slots 34, 36 and defining an opening therebetween. The lid 20 is disposed in the opening and extends laterally between the flanges 52 when the lid 20 is in the closed position. In other words, the lid 20 is at least partially enclosed within the opening and the internal cavity 32 of the housing 18.

A biasing device 58 is provided for biasing the housing 18 and the lid 20 to the closed position. Preferably the biasing device 58 comprises a spring 58 interconnecting the lid 20 and the housing 18. Even more preferably, the spring 58 is further defined as a C-shaped leaf spring 58.

As best shown in FIG. 6, the lid 20 also includes a first spring aperture 54. The housing rear wall 26 includes second spring aperture 56. The apertures 54, 56 are adapted to receive the C-shaped spring 58. The spring 58 is adapted to spring-load or bias the lid 20 of the cover 17 in the closed position.

Referring again to FIGS. 4 and 5, a mechanism 60 is provided to automatically move the lid 20 from the closed position to the open position in response to the housing 18 moving. The mechanism 60 is preferably a ramped surface 60 extending downwardly from the lid 20. Even more preferably, the mechanism 60 includes a pair of opposing side flanges 40, 42 extending from the lid 20 having the ramped surface 60. The flanges 40, 42 are ramped from a front of the cover 17 to the living hinge 22. Hence, the ramped surface 60 is configured to slant downwardly and rearwardly relative to the lid 20 such that the ramped surface 60 and the slots 34, 36 cross when the lid 20 is in the closed position.

The lid 20 and the bottom 24 of the housing 18 diverge from one another from front to rear when the cover 17 is in the closed position. In other words, the thickness of the front of the cover 17 is smaller than the thickness of the rear of the cover 17.

At least one stop 44, 46 is also provided for holding the lid 20 open when the housing 18 is in the fully open position (shown in FIG. 9) as further described below. The stops 44, 46 are further defined as a notches 44, 46 disposed adjacent the ramped surface 60. Preferably, each flange 40, 42 includes a corresponding notch 44, 46, respectively, which define a pair of teeth. The notches 44, 46 are formed in the flanges 40, 42 near the rear of the cover 17 adjacent the living hinge 22.

Referring still to FIGS. 4 and 5, the anchor 16 includes a front cross bar 48 and a pair of parallel side portions 50. The front cross bar 48 of the anchor 16 is presented by the side portions 50 to receive the mating latch 21 (shown in FIG. 9). As discussed above, the anchor 16 secures the child seat 15 to the seat assembly 10.

When the cover 17 is moved between the closed and fully open positions, the side portions 50 of the anchor 16 slide along the first 34 and second 36 slots, respectively. The angled slots 34, 36 therefore move the cover 17 in an angled orientation relative to the anchor 16 as the cover 17 moves between the fully open and closed positions. The angled orientation is designed to compliment the configuration of the seat cushion 12.

The side walls 28, 30 and the bottom 24 of the housing 18 define an open front for access to the anchor 16 when the cover 17 is in the open position. The lid 20 further includes a front lip 38 for covering the open front of the housing 18 when the cover 17 is in the closed position.

Figure 7:
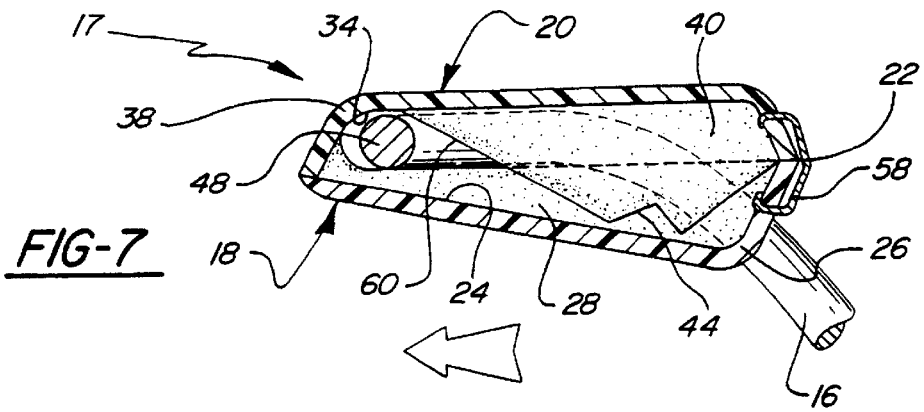
FIG. 7 is a sectional side view of the cover in the closed position about the anchor.
Figure 8:
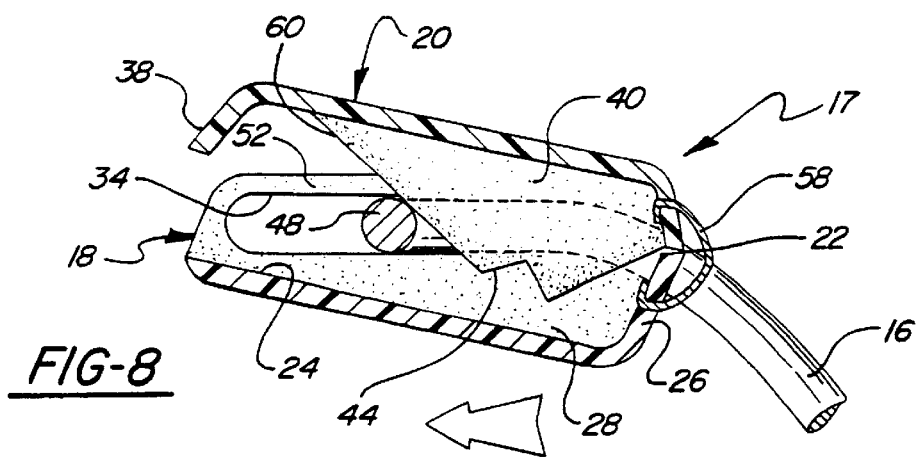
FIG. 8 is a sectional side view of the cover in a partially-opened position about the anchor.
Figure 9:
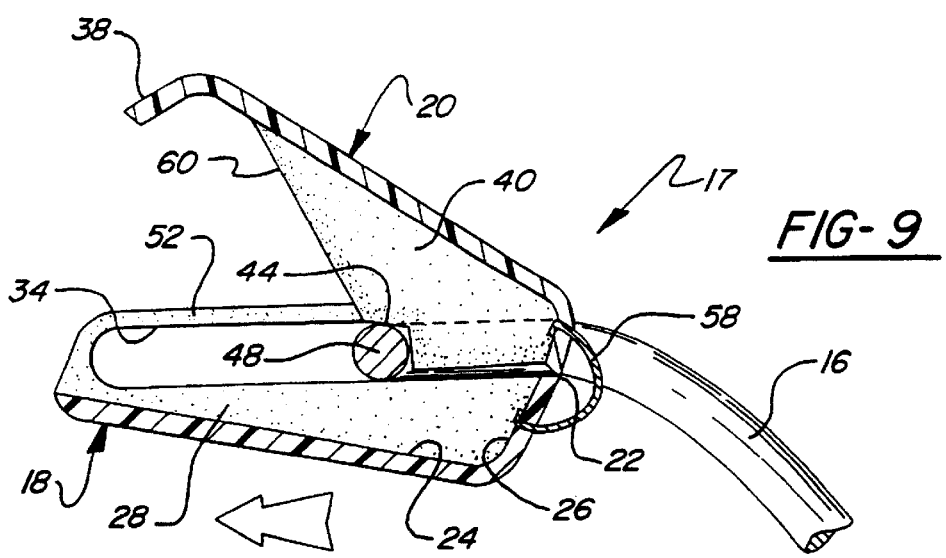
FIG. 9 is a sectional side view of the cover in a fully open position about the anchor.

FIGS. 7 through 9 illustrate the movement of the lid 20 and other associated cover components of the cover 17 between the closed position and the opened position as the cover 17 is manually pulled away from the anchor 16 as indicated by the arrows shown in FIGS. 7–9. FIG. 7 is a cross-sectional side view of the anchor 16 and the cover 17 in the closed position. The cover 17 is spring-loaded in the closed position with the spring 58. In this closed position, the front cross bar 48 of the anchor 16 is positioned in the slots 34, 36 between the front lip 38 and the flanges 40,42 of the lid 20.

FIG. 8 is a cross-sectional side view of the anchor 16 and the cover 17 in a partially-opened position. The cover 17 has been manually pulled in the direction of the arrow relative to the closed position illustrated in FIG. 7. In the partially-opened position, the front cross bar 48 of the anchor 16 is positioned in the middle of the slots 34, 36 against the flanges 40,42 of the lid 20. As the cover 17 is manually pulled in the direction of the arrow, the ramped surface 60 of the flanges 40,42 is moved into contact with the front cross bar 48 of the anchor 16. This manual pulling overcomes the spring-loaded force of the spring 58 and forces the lid 20 upward. In the partially-opened position, the spring 58 is compressed under tension. If the manual pull force is removed in the partially-opened position, the spring 58 will force the cover 17 back into the closed position, as shown in FIG. 7.

FIG. 9 is a cross-sectional side view of the anchor 16 and the cover 17 in a completely opened position., The cover 17 has been further pulled in the direction of the arrow relative to the closed position illustrated in FIG. 7 and the partially-opened position illustrated in FIG. 8. In the opened position, the front cross bar 48 of the anchor 16 is positioned in the notches 44, 46 of the flanges 40,42. As the cover 17 is pulled further in the direction of the arrow relative to the partially-opened position illustrated in FIG. 8, the ramped surface 60 of the flanges 40,42 is slid further along the front cross bar 48 of the anchor 16 to the notches 44, 46. In the opened position, the spring 58 is compressed under greater tension. Nevertheless, the notches 44, 46 are adapted to lock the cover 17 in the opened position when the manual pull force is removed. In this position, the corresponding latch 19, 21 of the child seat 15 can be secured to the cross bar 48 of the anchor 16.

To return the lid 20 to the closed position, the cover 17 must be manually pushed in the opposite direction to dislodged the front cross bar 48 of the anchor 16 from the notches 44, 46. That is, the cover 17 is pushed toward the seat back 14 forcing the cross bar 48 out of the notches 44, 46 and along the slots 34, 36. As the cross bar 48 rides along the ramped surface 60, the spring 58 automatically urges the lid 20 to the closed position and the cover 17 may be recessed between the seat cushion 12 and seat back 14 so as to not obstruct the adult passenger seating area.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims the invention may be practiced otherwise than as specifically described.

What is claimed is:

1. A seat assembly (10) comprising:
   a seat cushion (12),
   an anchor (16) presented by said seat cushion (12) and adapted for anchoring a child seat (15), and
   a cover assembly (17) comprising a housing (18) coupled to said anchor (16), a lid (20) for covering said housing, a hinge (22) interconnecting said housing (18) and said lid (20 for providing pivotal movement of said lid (20) between a fully open position providing access to said anchor (16) and a closed position covering said anchor (16) and closing said housing (18), said housing (18) including first (34) and second (36) guides slidably supporting said housing (18) on said anchor (16) for sliding movement relative to said anchor (16) between a retracted position and an extended position, and said lid (20) including a mechanism (60) for automatically pivoting said lid (20) from said closed position to said fully open position in response to said housing (18) sliding relative to said anchor (16) from said retracted position to said extended position, whereby said cover (17) slides along said anchor (16) in a first direction and conceals said anchor (16) when moving from said fully open position to said closed position, and said cover (17) slides along said anchor (16) in a second direction opposite said first direction and exposes said anchor (16) for attachment to the child seat (15) when moving from said closed position to said fully open position.

2. An assembly as set forth in claim 1 further including a biasing device (58) for biasing said housing (18) and said lid (20) to said closed position.

3. An assembly as set forth in claim 2 further including at least one stop (44, 46) for holding said lid (20) in said fully open position.

4. An assembly as set forth in claim 2 further including at least one stop (44, 46) for holding said lid (20) in said fully open position until said housing (18) is moved from said extended position toward said retracted position.

5. An assembly as set forth in claim 4 further including a seat back (14) disposed adjacent said seat cushion (12) with said anchor (16) extending between said seat cushion (12) and said seat back (14).

6. An assembly as set forth in claim 5 wherein said cover (17) moves linearly into a retracted and closed position between said seat cushion (12) and said seat back (14) thereby covering said anchor (16) and linearly out of said retracted position to an extended and fully open position out from between said seat cushion (12) and said seat back (14) thereby exposing said anchor (16) for attachment to the child seat (15).

7. An assembly as set forth in claim 4 wherein said housing (18) includes a pair of spaced side walls (28, 30) and said first (34) and second (36) guides are further defined as a first slot (34) and an opposing second slot (36) formed in said spaced side walls (28, 30).

8. An assembly as set forth in claim 7 wherein said anchor (16) rides within said slots (34, 36) and includes a crossbar (48) extending between said slots (34, 36), said mechanism (60) being further defined as a ramped surface (60) extending downwardly from said lid (20) for engaging said crossbar (48).

9. An assembly as set forth in claim 8 wherein said stop (44, 46) is further defined as a notch (44, 46) disposed adjacent said ramped surface (60) for receiving said crossbar (48).

10. An assembly as set forth in claim 8 wherein said housing (18) includes a bottom (24) with said slots (34, 36) slanting upwardly and rearwardly relative to said bottom (24).

11. An assembly as set forth in claim 10 wherein said ramped surface (60) slants downwardly and rearwardly relative to said lid (20) such that said ramped surface (60) and said slots (34, 36) cross in said closed position.

12. An assembly as set forth in claim 11 wherein said anchor (16) includes side portions (50) slidably disposed in said slots (34, 36).

13. An assembly as set forth in claim 12 wherein said housing (18) includes flanges (52) overlying said slots (50) and defining an opening there between, said lid (20) being disposed in said opening and extending laterally between said flanges (52) in said closed position.

14. An assembly as set forth in claim 13 wherein said lid (20) and said bottom (24) of said housing (18) diverge from one another from front to rear in said retracted and closed position.

15. An assembly as set forth in claim 14 wherein said side walls (28, 30) and said bottom (24) of said housing (18) define an open front for access to said anchor (16) in said fully open position.

16. An assembly as set forth in claim 15 wherein said lid (20) includes a front lip (38) for covering said open front of said housing (18) in said closed position.

17. An assembly as set forth in claim 16 further including a biasing device (58) for biasing said housing (18) and said lid (20) to said closed position.

18. An assembly as set forth in claim 17 wherein said biasing device (58) comprises a spring (58) interconnecting said lid (20) and said housing (18).

19. An assembly as set forth in claim 18 wherein said lid (20) includes a first spring aperture (54) and said housing (18) includes a second spring aperture (56), said spring (58) being further defined as a leaf spring (58) having ends disposed in said first (54) and second (56) spring apertures.

20. A cover assembly (17) for covering a child seat anchor (16) presented by a vehicle seat, said cover assembly (17) comprising;

a housing (18), a lid (20), a hinge (22) interconnecting said housing (18) and said lid (20) for providing pivotal movement of said lid (20) between a fully open position providing access to the anchor (16) and a closed position covering the anchor (16) and closing said housing (18), said housing (22) comprising first (34) and second (36) guides for slidably supporting said housing (18) on the anchor (16) for sliding movement relative to the anchor (16) between a retracted position and an extended position, and said lid (20) comprising a mechanism (6) for automatically pivoting said lid (20) from said closed position to said fully open position in response to said housing (18) sliding relative to the anchor (16) from said retracted position to said extended position whereby said cover (17) may be moved into said retracted and closed positions covering the anchor (16) and out of said retracted position to said extended and fully open positions exposing the anchor (16) for attachment to a child seat (15).

21. An assembly as set forth in claim 20 further including at least one stop (44, 46) for holding said lid (20) in said fully open position.

22. An assembly as set forth in claim 20 further including at least one stop (44, 46) for holding said lid (20) in said fully open position until said housing (18) is moved from said extended position toward said retracted position.

23. An assembly as set forth in claim 22 wherein said housing (18) includes a pair of spaced side walls (28, 30) and said first (34) and second (36) guides are further defined as a first slot (34) and an opposing second slot (36) formed in said side walls (28, 30).

24. An assembly as set forth in claim 23 wherein said mechanism (60) is further defined as a ramped surface (60) extending downwardly from said lid (20) for engaging the anchor (16).

25. An assembly as set forth in claim 24 wherein said stop (44, 46) is further defined as a notch (44, 46) disposed adjacent said ramped surface (60) for receiving the anchor (16).

26. An assembly as set forth in claim 25 wherein said housing (18) includes a bottom (24) and said slots (34, 36) slant upwardly and rearwardly relative to said bottom (24).

27. An assembly as set forth in claim 26 wherein said ramped surface (60) slants downwardly and rearwardly relative to said lid (20) such that said ramped surface (60) and said slots (34, 36) cross in said closed position.

28. An assembly as set forth in claim 27 wherein said housing (18) includes flanges (52) overlying said slots (34, 36) and defining an opening there between, said lid (20) being disposed in said opening and extending laterally between said flanges (52) in said closed position.

29. An assembly as set forth in claim 28 wherein said lid (20) and said bottom (24) of said housing (18) diverge from one another from front to rear in said retracted and closed position.

30. An assembly as set forth in claim 29 wherein said side walls (28, 30) and said bottom (24) of said housing (18) define an open front for access to said anchor in said fully open position.

31. An assembly as set forth in claim 30 wherein said lid (20) includes a front lip (38) for covering said open front of said housing (18) in said closed position.

32. An assembly as set forth in claim 31 further including a biasing device (58) for biasing said housing (18) and said lid (20) to said closed position.

33. An assembly as set forth in claim 32 wherein said biasing device (58) comprises a spring (58) interconnecting said lid (20) and said housing (18).

34. An assembly as set forth in claim 33 wherein said lid (20) includes a first spring aperture (54) and said housing (18) includes a second spring aperture (56), said spring (58) being further defined as a leaf spring (58) having ends disposed in said first (54) and second (56) spring apertures.

* * * * *

UNITED STATES PATENT AND TRADEMARK OFFICE
CERTIFICATE OF CORRECTION

PATENT NO. : 6,601,917 B1
DATED : August 5, 2003
INVENTOR(S) : Christopherson

It is certified that error appears in the above-identified patent and that said Letters Patent is hereby corrected as shown below:

Column 5,
Line 52, add -- ) -- after first occurrence of "(20".

Column 6,
Line 54, period "." should be a common -- , --.

Signed and Sealed this

Twenty-first Day of October, 2003

JAMES E. ROGAN
*Director of the United States Patent and Trademark Office*